United States Patent
Bojanowski et al.

(10) Patent No.: US 9,290,084 B2
(45) Date of Patent: Mar. 22, 2016

(54) MODULAR SUNROOF FRAME ASSEMBLY AND METHOD

(71) Applicant: GM GLOBAL TECHNOLOGY OPERATIONS LLC, Detroit, MI (US)

(72) Inventors: Gerald M. Bojanowski, Washington Township, MI (US); James A. Forbes, Ortonville, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/292,189

(22) Filed: May 30, 2014

(65) Prior Publication Data
US 2015/0343887 A1  Dec. 3, 2015

(51) Int. Cl.
*B60J 7/043* (2006.01)
*B60J 7/00* (2006.01)
*B23P 15/00* (2006.01)

(52) U.S. Cl.
CPC .............. *B60J 7/043* (2013.01); *B23P 15/00* (2013.01); *B60J 7/0084* (2013.01); *B23P 2700/50* (2013.01); *Y10T 29/49623* (2015.01)

(58) Field of Classification Search
CPC ................................ B60J 7/0084; B60J 7/022
USPC ................ 296/216.01–224, 213, 210, 203.03
See application file for complete search history.

(56) References Cited

U.S. PATENT DOCUMENTS

| | | | | |
|---|---|---|---|---|
| 4,159,144 A | * | 6/1979 | Ehlen et al. | 296/222 |
| 4,332,416 A | * | 6/1982 | Lutz et al. | 296/213 |
| 5,046,779 A | * | 9/1991 | Ichinose et al. | 296/216.04 |
| 5,332,282 A | * | 7/1994 | Maeda et al. | 296/213 |
| 6,644,728 B1 | * | 11/2003 | Nagashima et al. | 296/213 |
| 6,877,796 B2 | * | 4/2005 | Kimura | 296/187.13 |
| 8,246,109 B2 | * | 8/2012 | Wykoff et al. | 296/216.08 |
| 8,562,070 B2 | * | 10/2013 | Weyl et al. | 296/216.08 |
| 8,613,467 B2 | * | 12/2013 | Tanaka et al. | 280/730.2 |
| 8,915,542 B2 | * | 12/2014 | Kanai | 296/216.06 |

* cited by examiner

*Primary Examiner* — Dennis H Pedder
(74) *Attorney, Agent, or Firm* — Quinn Law Group, PLLC

(57) ABSTRACT

A modular sunroof frame assembly and method for a vehicle having a body structure is provided. The modular sunroof frame assembly is attachable to the body structure and includes right and left side rails, front and rear cross beams, and a plurality of corner attachment couplings. The right and left side rails have respective cross-sections throughout their length, front rail ends, and rear rail ends. The front and rear cross beams have respective cross-sections throughout their length, right beam ends, and left beam ends. The corner attachment couplings are fixed to the respective side rail end and to the respective cross beam end.

7 Claims, 4 Drawing Sheets

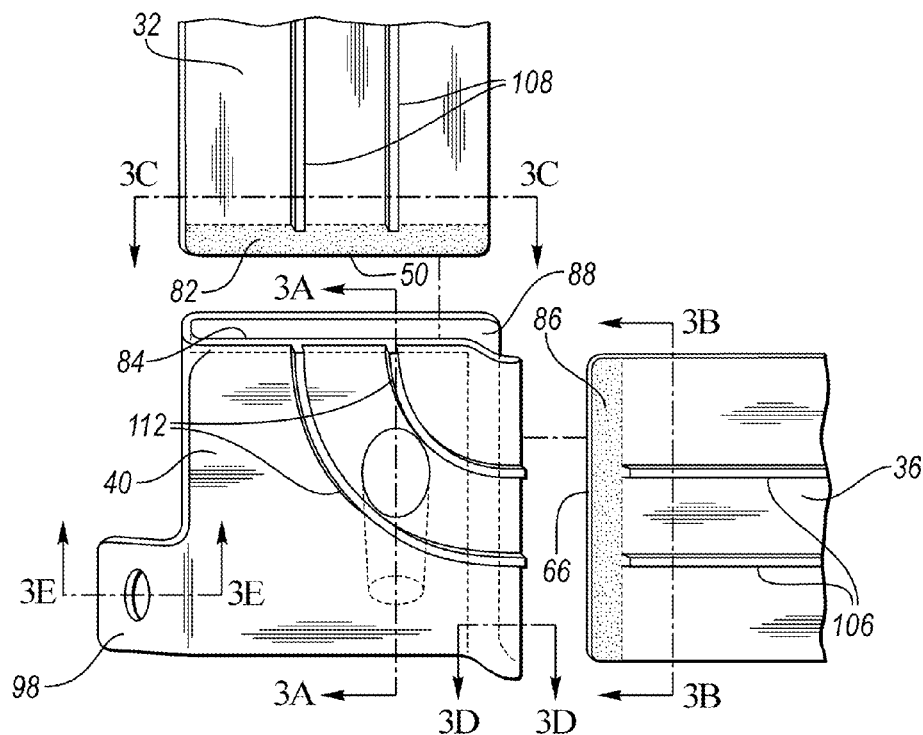
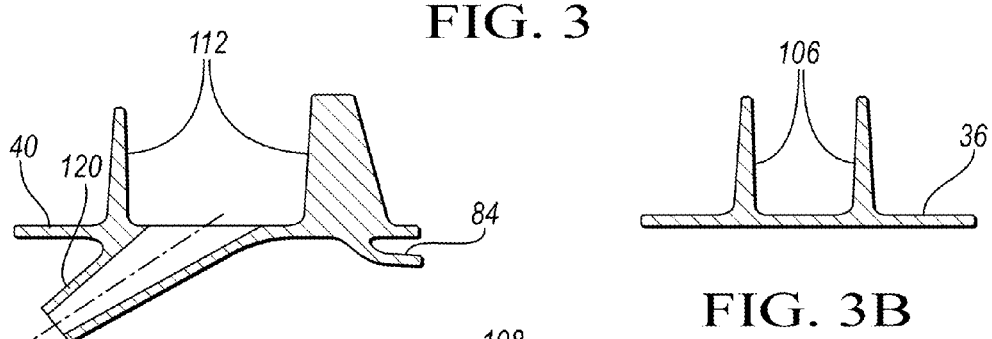
FIG. 3
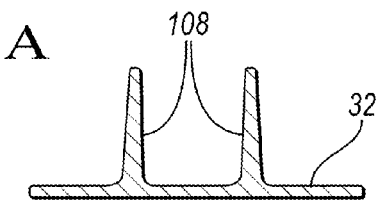
FIG. 3A
FIG. 3B
FIG. 3C
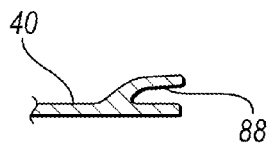
FIG. 3D
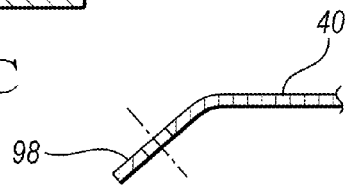
FIG. 3E

MODULAR SUNROOF FRAME ASSEMBLY AND METHOD

TECHNICAL FIELD

This disclosure relates to a vehicle sunroof frame assembly and a method to manufacture the same.

BACKGROUND

Some vehicles include a sunroof. The sunroof may include a sunroof frame assembly that is attachable to the vehicle body structure. The sunroof frame assembly may facilitate sunroof assembly to the vehicle and may provide structural support for the sunroof glass, the sunroof opening and closing mechanism, the sunroof sealing mechanism, and other sunroof mechanisms and features. The sunroof frame assembly may include side rail and cross beam components.

SUMMARY

It may be beneficial for the sunroof frame assembly to be modular, i.e. for the components of the sunroof frame assembly to be configured such that sunroof frame assemblies of various sizes and shapes can be produced from a single set of component tools or dies. Thus, a single set of component tools or dies may be used to manufacture sunroof frame assemblies for differing vehicle designs.

A sunroof frame assembly is provided for use in a vehicle having a body structure. The sunroof frame assembly is attachable to the body structure and includes a right side rail, a left side rail, a front cross beam, a rear cross beam, a right-front corner attachment coupling, a right-rear corner attachment coupling, a left-rear corner attachment coupling, and a left-front corner attachment coupling. The right side rail has a first cross-section throughout its length, a front end, and a rear end. The left side rail has a second cross-section throughout its length, a front end, and a rear end. The front cross beam has a third cross-section throughout its length, a right end, and a left end. The rear cross beam has a fourth cross-section throughout its length, a right end, and a left end.

The right-front corner attachment coupling is fixed to the right side rail front end and to the front cross beam right end. The right-rear corner attachment coupling is fixed to the right side rail rear end and to the rear cross beam right end. The left-rear corner attachment coupling is fixed to the left side rail rear end and to the rear cross beam left end. The left-front corner attachment coupling is fixed to the left side rail front end and to the front cross beam left end.

Each side rail and each cross beam may have a respective body structure attachment feature for attaching the sunroof frame assembly to the vehicle. The right side rail, the left side rail, and the front cross beam cross-sections may be substantially identical. Each side rail and each cross beam may be formed by extrusion. One of the side rails and the cross beams may be further formed by bending. Each corner attachment coupling may be formed by casting. The corner attachment couplings may be fixed to the respective side rail end and to the respective cross beam end via an adhesive.

A vehicle is also provided. The vehicle has a body structure and a sunroof. The sunroof includes a sunroof frame assembly and a plurality of fasteners. The sunroof frame assembly includes a right side rail, a left side rail, a front cross beam, a rear cross beam, a right-front corner attachment coupling, a right-rear corner attachment coupling, a left-rear corner attachment coupling, and a left-front corner attachment coupling. The right side rail has a first cross-section throughout its length, a front end, a rear end, and a body structure attachment feature. The left side rail has a second cross-section throughout its length, a front end, a rear end, and a body structure attachment feature. The front cross beam has a third cross-section throughout its length, a right end, a left end, and a body structure attachment feature. The rear cross beam has a fourth cross-section throughout its length, a right end, a left end, and a body structure attachment feature.

The right-front corner attachment coupling is fixed to the right side rail front end and to the front cross beam right end. The right-rear corner attachment coupling is fixed to the right side rail rear end and to the rear cross beam right end. The left-rear corner attachment coupling is fixed to the left side rail rear end and to the rear cross beam left end. And, the left-front corner attachment coupling is fixed to the left side rail front end and to the front cross beam left end. The plurality of fasteners attach the sunroof frame assembly to the body structure through the respective body structure attachment features.

Each side rail and each cross beam may be formed by extrusion. The first, the second, and third cross-sections may be substantially identical. One or more of the side rails and cross beams may be further formed by bending. Each corner attachment coupling may be formed by casting. The corner attachment couplings may be fixed to the respective rail end and to the respective cross beam end via an adhesive.

A method to manufacture a sunroof frame assembly for use in a vehicle is also provided. The method includes extruding right and left side rails and front and rear cross beams; casting corner attachment couplings for interconnecting respectively the side rails to the cross beams; and interconnecting respectively the side rails to the cross beams with a respective corner attachment coupling. The method may include bending one or more of the side rails and the cross beams. Interconnecting may include adhesive bonding.

The sunroof frame assembly and method enables the sunroof frame assembly to be modular, i.e. for the components of the sunroof frame assembly to be configured such that sunroof frame assemblies of various sizes and shapes can be produced from a single set of component tools or dies. Thus, sunroof frame assemblies for differing vehicle designs can be manufactured from a single set of component tools or dies.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a schematic fragmentary exploded perspective illustration of the right-front corner area of the modular sunroof frame assembly of FIG. 2 at phantom circle 3, showing the right side rail, the right-front corner attachment coupling, and the front cross beam of the sunroof frame assembly;

FIG. 3A is a schematic cross-section illustration of the right-front corner attachment coupling of FIG. 3 along the line 3A-3A;

FIG. 3B is a schematic cross-section illustration of the front cross beam of FIG. 3 along the line 3B-3B;

FIG. 3C is a schematic cross-section illustration of the right side rail of FIG. 3 along the line 3C-3C;

FIG. 3D is a schematic cross-section illustration of the right-front corner attachment coupling of FIG. 3 along the line 3D-3D;

FIG. 3E is a schematic cross-section illustration of the right-front corner attachment coupling of FIG. 3 along the line 3E-3E;

DETAILED DESCRIPTION

Figure 1:
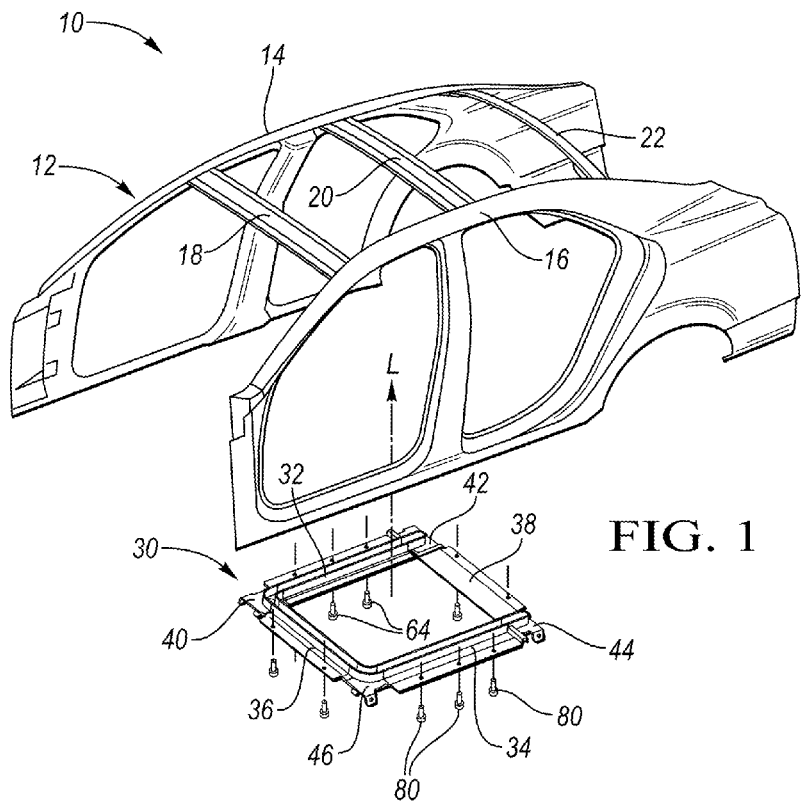
FIG. 1 is a fragmentary schematic exploded perspective illustration of a vehicle including a body structure and a modular sunroof frame assembly attachable to the vehicle body structure.

Referring to the drawings, wherein like reference numbers refer to like components throughout the views, FIG. 1 shows a vehicle 10 having a body structure 12 and a modular sunroof frame assembly 30. The modular sunroof frame assembly 30 is attachable to the vehicle body structure 12. The modular sunroof frame assembly 30 may facilitate sunroof assembly to the vehicle 10 and may provide structural support for the sunroof glass, the sunroof opening and closing mechanism, the sunroof sealing mechanism, and other sunroof mechanisms and features. The modular sunroof frame assembly 30 is assembled from several components, as described in greater detail below.

The vehicle 10 design may be one of a number of differing vehicle designs. For example, the vehicle 10 may be one body style of a number of body styles included in a vehicle architecture. A vehicle architecture typically includes a number of body styles of a similar type and size. Some examples of vehicle architectures include, but are not limited to, a large passenger vehicle architecture, a mid-size truck architecture, and a small SUV architecture. Some examples of body styles within a large passenger car architecture include, but are not limited to, a sedan, a coupe, and a hatchback. Those familiar with the art will know that there are many other types of vehicle architectures and many other types of body styles within a vehicle architecture. Thus, differing vehicle 10 designs may include a variety of differing body styles from a variety of differing vehicle architectures.

The vehicle body structure 12 may include a right roof rail 14, a left roof rail 16, a front header 18 attached to the roof rails 14, 16, one or more roof bows 20 attached to the roof rails 14, 16, and a rear header 22, attached to the roof rails 14, 16. The modular sunroof frame assembly 30 may be loaded from below the roof rails 14, 16, the headers 18, 22, and the one or more roof bows 20 in loading direction L. The modular sunroof frame assembly 30 may be attached to the roof rails 14, 16 and to two of the headers 18, 22 and the one or more roof bows 20. The modular sunroof frame assembly 30 may be attached to the roof rails 14, 16 and to two of the headers 18, 22 and the one or more roof bows 20 via fasteners 80. Brackets (not shown) may be attached to the roof rails 14, 16 and to two of the headers 18, 22 and the one or more roof bows 20 to facilitate fastening of the modular sunroof frame assembly 30 to the body structure 12. The modular sunroof frame assembly 30 may alternatively be loaded from above the body structure 12 in the opposite direction from the direction L. The modular sunroof frame assembly 30 may be attached to the roof rails 14, 16 and to two of the headers 18, 22 and the one or more roof bows 20 via other attachments, including but not limited to, adhesive bonding and mechanical interlocks. The modular sunroof assembly 30 may be attached to the body structure 12 in any other suitable location.

The roof rails 14, 16, the headers 18, 22, and the one or more roof bows 20 may have differing configurations in differing vehicle designs. These differing configurations may include differences in the sizes and the shapes of the roof rails 14, 16, the headers 18, 22, and the one or more roof bows 20. The components of the sunroof frame assembly 30 may be configured such that the sunroof frame assembly 30 can be manufactured in differing sizes and shapes from a single set of component tools or dies, as described below. Thus, differing sunroof frame assemblies 30 may be manufactured from a single set of component tools for differing vehicle designs.

Figure 2:
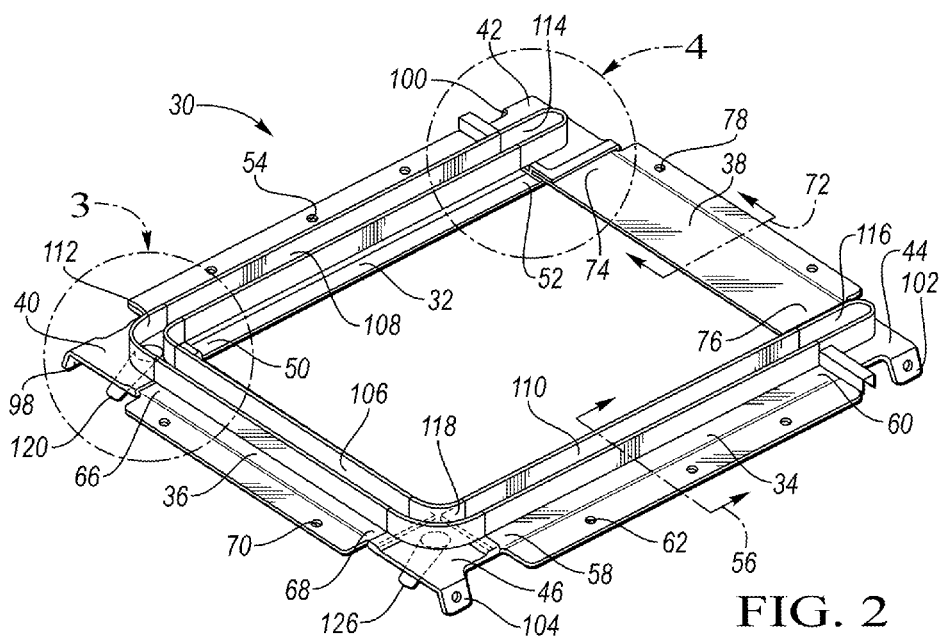
FIG. 2 is a schematic perspective illustration of the modular sunroof frame assembly of FIG. 1 showing left and right side rails, front and rear cross beams, corner attachment couplings, water management features, drain tube nozzles, and body structure attachment features.

Referring now to FIG. 2, the sunroof frame assembly 30 includes a right side rail 32, a left side rail 34, a front cross beam 36, a rear cross beam 38, a right-front corner attachment coupling 40, a right-rear corner attachment coupling 42, a left-rear corner attachment coupling 44, and a left-front corner attachment coupling 46. The right side rail may have a first cross-section 48, best seen in FIG. 3C, throughout its length, a front end 50, a rear end 52, and a body structure attachment feature 54. Similarly, the left side rail 34 may have a second cross-section 56 throughout its length, a front end 58, a rear end 60, and a body structure attachment feature 62. The front cross beam 36 may have a third cross-section 64, best seen in FIG. 3B, throughout its length, a right end 66, a left end 68, and a body structure attachment feature 70. Similarly, the rear cross beam 38 may have a fourth cross-section 72 (not shown in detail) throughout its length, a right end 74, a left end 76, and a body structure attachment feature 78. Each of the cross-sections 48, 56, 64, 72 may be a constant cross-section, perpendicular to the length of the respective side rail 32, 34 or cross beam 36, 38.

The second cross-section 56 may be substantially identical and/or a mirror image of the first cross-section 48, as shown. The fourth cross-section 72 may be a flat beam having a solid rectangular cross-section (as shown in FIG. 2), or alternatively may be substantially identical to and/or a mirror image of the third cross-section 64. The first cross-section 48, the second cross-section 56, and third cross-section 64 may be substantially identical. The first cross-section 48, the second cross-section 56, the third cross-section 64, and the fourth cross-section 72 may be substantially identical. The side rails 32, 34 and cross beams 36, 38 may be made of a metal or a non-metal. The side rails 32, 34 and cross beams 36, 38 may be made of aluminum.

Continuing with FIG. 2, the right-front corner attachment coupling 40 is fixed to the right side rail front end 50 and to the front cross beam right end 66. The right-rear corner attachment coupling 42 is fixed to the right side rail rear end 52 and to the rear cross beam right end 74. The left-rear corner attachment coupling 44 is fixed to the left side rail rear end 60 and to the rear cross beam left end 76. The left-front corner attachment coupling 46 is fixed to the left side rail front end 58 and to the front cross beam left end 68. The corner attachment couplings 40, 42, 44, 46 may be made of a metal or a non-metal. The corner attachment couplings 40, 42, 44, 46 may be made of aluminum.

The body structure attachment features 54, 62, 70, 78 may be holes formed in the respective side rails 32, 34 and cross beams 36, 38 of the sunroof frame assembly 30, as shown. Other suitable body structure attachment features 54, 62, 70, 78 may be used, including, but not limited to, mechanical interlock features and flanges for adhesive bonding. The vehicle 10, may include a plurality of fasteners 80, shown in FIG. 1, for attaching the sunroof frame assembly 30 to the body structure 12 through the respective body structure attachment features 54, 62, 70, 78.

The side rail 32, 34 or the cross beam 36, 38 having a cross-section throughout its length is defined as having a single or constant cross-section along the entire length and perpendicular to the length of the side rail 32, 34 or the cross beam 36, 38 from the front or right end 50, 58, 66, 74 to the respective opposite rear or left end 52, 60, 68, 76. Portions of the cross-section 48, 56, 64, 72 may be removed by machining or cutting to create the side rail 32, 34 or cross beam 36, 38 configuration used in the sunroof frame assembly 30.

The side rails 32, 34 and the cross beams 36, 38 may be formed by a manufacturing process that produces a single shape or single cross-section along an axis, straight or curved, such as extrusion, rolling, or any other suitable manufacturing process. In one embodiment, each side rail 32, 34 and at least one of the cross beams 36, 38 may be formed by extrusion. In another embodiment, each side rail 32, 34 and each cross beam 36, 38 may be formed by extrusion. The one or more extruded side rails 32, 34 and cross beams 36, 38 may be cut to the appropriate length after being extruded.

Shape or curvature may be added to the side rails 32, 34 and the cross beams 36, 38 by press bending, stretch bending, or any other suitable bending or shaping process. One or more of the side rails 32, 34 and the cross beams 36, 38 may be further formed by press or stretch bending. Press or stretch bending may be used to add a curvature or shape (not shown) to the side rails 32, 34 and the cross beams 36, 38. Portions of the side rails 32, 34 and cross beam 36, 38 may be removed by machining or cutting to create the side rail 32, 34 or cross beam 36, 38 configuration that is used in the sunroof frame assembly 30.

Thus, side rails 32, 34 and cross beams 36, 38 of differing lengths, curvatures, and shapes may be manufactured using a single set of four or fewer extrusion or rolling dies or tools. If necessary, a single set of press bending or stretch bending tools or dies may be included to form any curvature or shape that may be required. If any two or more of the cross-sections 48, 56, 64, 72 of the side rails 32, 34 and cross beams 36, 38 are substantially identical, then fewer than four extrusion or rolling dies or tools would be required in the single set of extrusion or rolling tools or dies. In another embodiment, one or more of the side rails 32, 34 and the cross beams 36, 38 may be formed by molding or by any other suitable forming method.

Each of the corner attachment couplings 40, 42, 44, 46 is fixed to the respective side rail end 50, 52, 58, 60 and to the respective cross beam end 66, 68, 74, 76. Each corner attachment coupling 40, 42, 44, 46 may be fixed to the respective side rail end 50, 52, 58, 60 and to the respective cross beam end 66, 68, 74, 76 via an adhesive, one or more welds, one or more fasteners, one or more mechanical interlocks, and/or any other suitable rigid and permanent connection.

The corner attachment couplings 40, 42, 44, 46 may be formed by casting, molding, machining, 3D printing, or by any other suitable manufacturing process. In one embodiment, at least one of the corner attachment couplings 40, 42, 44, 46 may be formed by casting. In another embodiment, each of the corner attachment couplings 40, 42, 44, 46 may be formed by casting. The same corner attachment couplings 40, 42, 44, 46 may be used in differing sunroof frame assembly 30 configurations for use in differing vehicle designs. Thus, the corner attachment couplings 40, 42, 44, 46 for differing sunroof frame assembly 30 configurations for use in differing vehicle designs may be formed in a single set of four tools or dies. In other embodiments, two or more of the corner attachment couplings 40, 42, 44, 46 may substantially identical and may be formed in the same tool or die, further reducing the number of tools or dies in the single set of tools or dies.

The use of extruded or rolled side rails 32, 34 and cross beams 36, 38 and cast or molded corner attachment couplings 40, 42, 44, 46 enables the sunroof frame assembly 30 to be modular, i.e. for the components of the sunroof frame assembly 30 to be configured such that sunroof frame assemblies 30 of differing configurations can be produced from a single set of component tools or dies. For example, four extrusion dies and four casting dies may be all of the dies or tools that are needed to produce a wide variety of sunroof frame assembly 30 configurations for use in differing vehicle designs. If necessary, a single set of press or stretch bending tools or dies may be included to produce any curvature or shape that may be required. More or less of each type of tool or die may be used as appropriate. The single set of tools or dies may be as few as one extrusion die and one casting die if each side rail 32, 34 and cross beam 36, 38 cross-section 48, 56, 64, 72 is substantially identical, each corner attachment coupling 40, 42, 44, 46 is substantially identical, and no press or stretch bending is required.

At least one of the corner attachment couplings 40, 42, 44, 46 may selectively include or not include a body structure attachment feature 98, 100, 102, 104 for attaching the sunroof frame assembly 30 to the body structure 12. The body structure attachment feature 98, 100, 102, 104 may include a flange or tab, as shown, and may include a hole formed in the flange or tab, as shown. The attachment feature 98, 100, 102, 104 may be configured for fastening the sunroof frame assembly to the vehicle body structure 12 via a fastener and/or an adhesive bond. Other suitable attachments may also be used.

Each of the side rails 32, 34 may include a respective side rail water management feature 108, 110 and the front cross beam 36 may include a cross beam water management feature 106 for managing water drainage from the sunroof frame assembly 30. In another embodiment (not shown), the rear cross beam 38 may also include a cross beam water management feature, similar to the front cross beam water management feature 106, for managing water drainage from the sunroof frame assembly 30. Each of the corner attachment couplings 40, 42, 44, 46 may include a respective corner water management feature 112, 114, 116, 118 for managing water drainage from the sunroof frame assembly 30. The water management features 106, 108, 110, 112, 114, 116, 118 may be channels with open or closed ends, as shown, or may be any other feature suitable for managing water drainage from the sunroof frame assembly 30. The channels may be U-shaped, as shown, V-shaped, or any other shape suitable for managing water drainage from the sunroof frame assembly 30. At least one of the corner attachment couplings 40, 42, 44, 46 may selectively include or not include a drain hose nozzle 120, 122, 126. One or more drain hoses (not shown) may be connectable to the one or more drain hose nozzles 120, 122, 126 to drain water away from the sunroof frame assembly 30. The water management features 106, 108, 110, 112, 114, 116,

118 and the one or more drain hose nozzles 120, 122, 126 may be configured to cooperate with one another to drain water from the sunroof frame assembly 30. A sealer, not shown, may be added between the respective water management features 106, 108, 110, 112, 114, 116, 118 to prevent water leakage.

Referring now to FIGS. 3-3E, the right-front corner attachment coupling 40, the right side rail front end 50, and the front cross beam right end 66 are shown in greater detail. The right-front corner attachment coupling 40 may include a right side rail adhesive bonding feature 84, a front cross beam adhesive bonding feature 88, the body structure attachment feature 98, the water management feature 112, and the drain nozzle 120. The right side rail 32 may include an adhesive bonding feature 82 and the water management feature 108. The front cross beam 36 may include an adhesive bonding feature 86 and the water management feature 106. The respective adhesive bonding features 82, 86, 84, 88 may configured to cooperate with one another to facilitate adhesive bonding of the right side rail front end 50 and the front cross beam right end 36 to the front-right corner attachment coupling 40.

Figure 4:
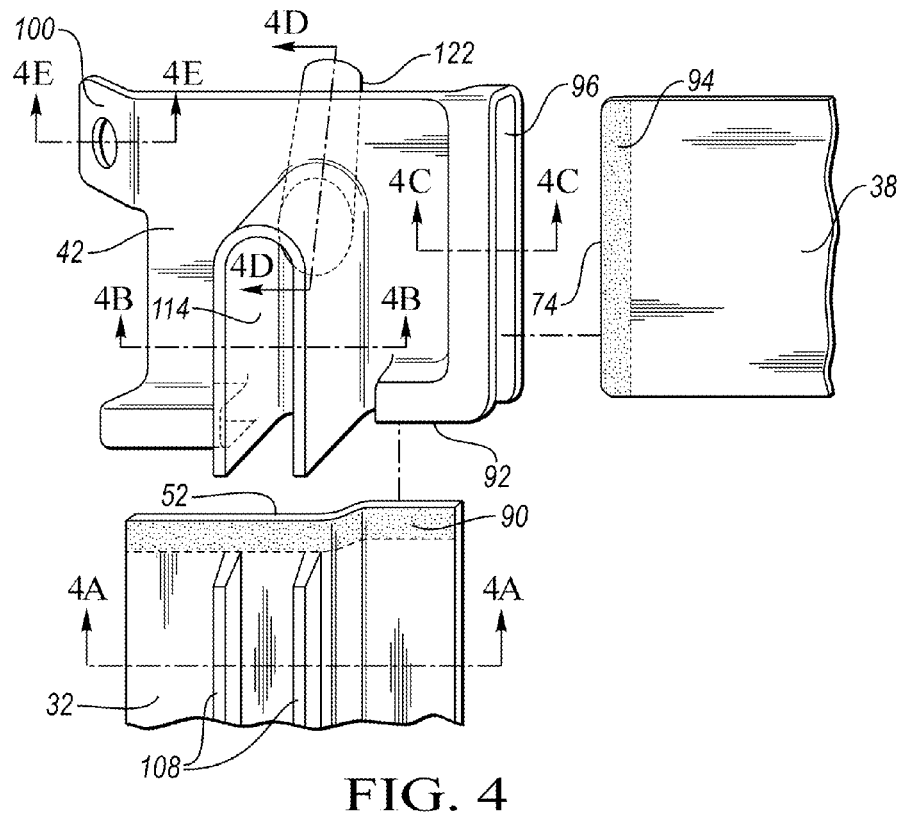
FIG. 4 is a fragmentary exploded perspective view schematic illustration of the right-rear corner of the modular sunroof frame assembly of FIG. 2 at phantom circle 4, showing another embodiment of the right side rail, the right-rear corner attachment coupling, and the rear cross beam of the sunroof frame assembly.
Figure 4A:
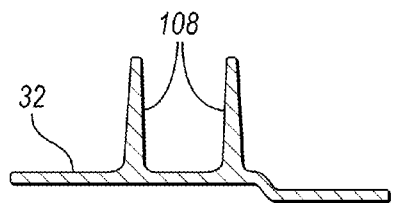
FIG. 4A is a schematic cross-section illustration of the right side rail of FIG. 4 along the line 4A-4A.
Figure 4B:
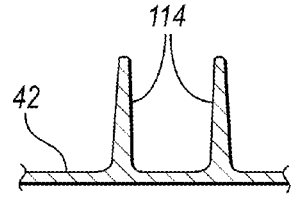
FIG. 4B is a schematic cross-section of the right-rear corner attachment coupling of FIG. 4 along the line 4B-4B.
Figure 4C:
FIG. 4C is a schematic cross-section of the right-rear corner attachment coupling of FIG. 4 along the line 4C-4C.
Figure 4D:
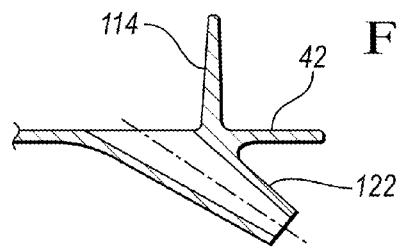
FIG. 4D is a schematic cross-section of the right-rear corner attachment coupling of FIG. 4 along the line 4D-4D.
Figure 4E:
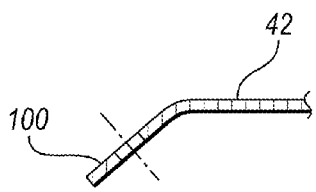
FIG. 4E is a schematic cross-section of the right-rear corner attachment coupling of FIG. 4 along the line 4E-4E.

Referring now to FIGS. 4-4E, similarly, the right-rear corner attachment coupling 42, the right side rail rear end 52, and the rear cross beam right end 74 are shown in greater detail. The right-rear corner attachment coupling 42 may include a right side rail adhesive bonding feature 92, a rear cross beam adhesive bonding feature 96, the body structure attachment feature 100, the water management feature 114, and the drain nozzle 122. The right side rail 32, shown as an embodiment different from the embodiment shown in FIG. 3, may include an adhesive bonding feature 90 and the water management feature 108. The rear cross beam 38 may include an adhesive bonding feature 94. The respective adhesive bonding features 90, 92, 94, 96 may configured to cooperate with one another to facilitate adhesive bonding of the right side rail rear end 52 and the rear cross beam right end 74 to the right-rear corner attachment coupling 42.

In another embodiment (not shown), two or more of the side rails 32, 34, the cross beams 36, 38, and the corner attachment couplings 40, 42, 44, 46 may be connected by inserting one or more of the side rails 32, 34 and the cross beams 36, 38 into one or more of the corner attachment coupling 40, 42, 44, 46 casting or molding tools prior to casting or molding one or more of the corner attachment couplings 40, 42, 44, 46.

Figure 5:
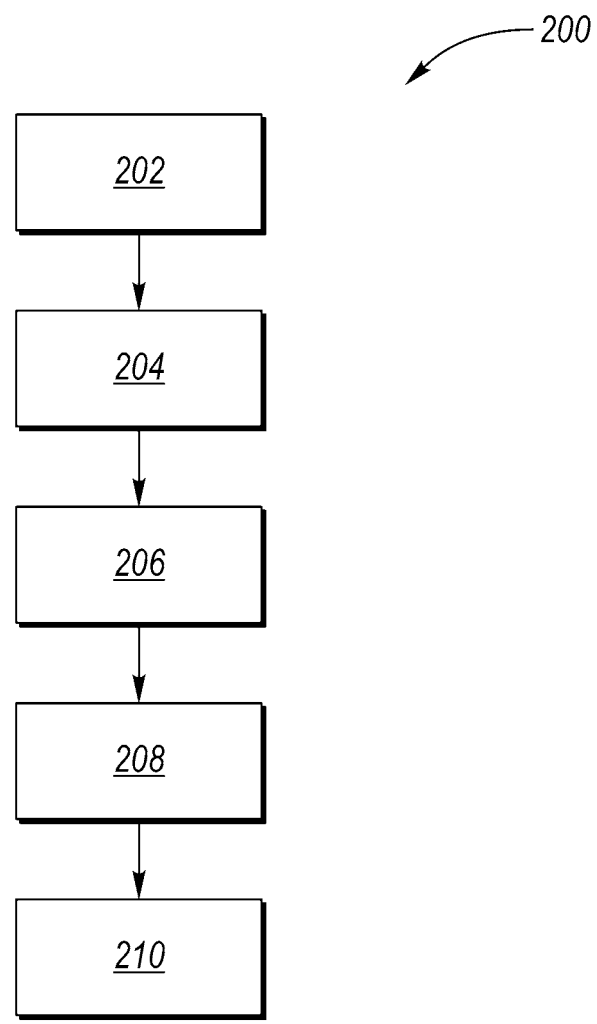
FIG. 5 is a flow chart of a method to manufacture a sunroof frame assembly for use in differing vehicle designs.

Referring now to FIG. 5, a method 200 to manufacture a sunroof frame assembly 30 for use in a vehicle 10 is provided. The method 200 includes: extruding 204 left and right side rails 32, 34 and front and rear cross beams 36, 38; casting 208 corner attachment couplings 40, 42, 44, 46 for interconnecting respectively the side rails 32, 34 to the cross beams 36. 38; and interconnecting 210 respectively the side rails 32, 34 to the cross beams 36, 38 with a respective corner attachment coupling 40, 42, 44, 46.

The method 100 may include bending 206 of at least one of the side rails 32, 34 and the cross beams 36, 38. Interconnecting 210 may include adhesive bonding. Casting 208 may include a die and selectively placing an insert into the die of at least one of the corner attachment couplings 40, 42, 44, 46 to form a body structure attachment feature 98, 100, 104. Casting 208 may include a die and selectively placing an insert into the die of at least one of the corner attachment couplings 40, 42, 44, 46 to form a drain hose nozzle 120, 122, 126. The method 200 may include configuring 202 a sunroof frame assembly 30 as interconnectable right and left side rails 32, 34, front and rear cross beams 36, 38, and corner attachment couplings 40, 42, 44, 46 for interconnecting respectively the side rails 32, 34 to the cross beams 36. 38. The method 200 may further comprise manufacturing additional sunroof frame assemblies of different dimensional sizes using the same tooling used to manufacture the sunroof frame assembly 30.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A sunroof frame assembly for a vehicle having a body structure, the sunroof frame assembly being attachable to the body structure and comprising:
   a right side rail having a first cross-section throughout its length, a front end, and a rear end;
   a left side rail having a second cross-section throughout its length, a front end, and a rear end;
   a front cross beam having a third cross-section throughout its length, a right end, and a left end;
   a rear cross beam having a fourth cross-section throughout its length, a right end, and a left end;
   a right-front corner attachment coupling fixed to the right side rail front end and to the front cross beam right end;
   a right-rear corner attachment coupling fixed to the right side rail rear end and to the rear cross beam right end;
   a left-rear corner attachment coupling fixed to the left side rail rear end and to the rear cross beam left end; and
   a left-front corner attachment coupling fixed to the left side rail front end and to the front cross beam left end;
   wherein each of the cross-sections is a constant cross-section, perpendicular to the length of the respective side rail or cross beam; and
   wherein the first cross-section, the second cross-section, and third cross-section are substantially identical.

2. The sunroof frame assembly of claim 1, wherein each side rail and each cross beam further has a respective body structure attachment feature for attaching the sunroof frame assembly to the vehicle.

3. The sunroof frame assembly of claim 1, wherein each side rail and each cross beam is formed by extrusion and each corner attachment coupling is formed by casting.

4. The sunroof frame assembly of claim 3, wherein at least one of the side rails and the cross beams is further formed by bending.

5. The sunroof frame assembly of claim 3, wherein the corner attachment couplings are fixed to the respective side rail end and to the respective cross beam end via an adhesive.

6. The sunroof frame assembly of claim 2, wherein at least one of the corner attachment couplings includes an attachment feature for attaching the sunroof frame assembly to the body structure.

7. The sunroof frame assembly of claim 1, wherein each of the side rails further includes a respective side rail water management feature, the front cross beam further includes a cross beam water management feature, each of the corner attachment couplings includes a respective corner water management feature, and at least one of the corner attachment couplings further includes a drain hose nozzle; and wherein the water management features and the drain hose nozzle are configured to cooperate with one another to drain water from the sunroof frame assembly.

* * * * *